US007871085B2

(12) United States Patent
Sasaki (10) Patent No.: US 7,871,085 B2
(45) Date of Patent: Jan. 18, 2011

(54) REAR WHEEL TOE ANGLE CONTROL DEVICE

(75) Inventor: Hiroaki Sasaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 134 days.

(21) Appl. No.: 12/412,908

(22) Filed: Mar. 27, 2009

(65) Prior Publication Data

US 2009/0243237 A1    Oct. 1, 2009

(30) Foreign Application Priority Data

Mar. 27, 2008 (JP) .............................. 2008-083271
Mar. 24, 2009 (JP) .............................. 2009-071668

(51) Int. Cl.
*B62D 6/00* (2006.01)

(52) U.S. Cl. ..................... 280/5.524; 701/72; 701/90

(58) Field of Classification Search ............. 280/5.524; 701/39, 72, 75, 90, 91; 180/197
See application file for complete search history.

(56) References Cited

U.S. PATENT DOCUMENTS

| 4,964,481 | A | * | 10/1990 | Sano et al. ................. 180/412 |
| 5,116,254 | A | * | 5/1992 | Sano et al. ................. 180/412 |
| 5,408,411 | A | * | 4/1995 | Nakamura et al. ............ 701/48 |
| 5,540,298 | A | * | 7/1996 | Yoshioka et al. ............ 180/169 |
| 7,516,965 | B2 | * | 4/2009 | Horiuchi .................... 280/5.52 |
| 2004/0162663 | A1 | | 8/2004 | Kogure et al. |
| 2008/0162009 | A1 | * | 7/2008 | Miki et al. .................... 701/80 |
| 2008/0177442 | A1 | * | 7/2008 | Tsukasaki et al. ............ 701/38 |

FOREIGN PATENT DOCUMENTS

| JP | 4287771 | | 10/1992 |
| JP | 6166377 | A | 6/1994 |
| JP | 6336172 | | 12/1994 |
| JP | 9-030438 | | 2/1997 |
| JP | 9030438 | A | 2/1997 |
| JP | 10-071819 | | 3/1998 |
| JP | 10324260 | | 12/1998 |
| JP | 2000118429 | | 4/2000 |
| JP | 2004268858 | | 9/2004 |
| JP | 2006175980 | | 7/2006 |
| JP | 2007223390 | | 9/2007 |

\* cited by examiner

*Primary Examiner*—Paul N Dickson
*Assistant Examiner*—Timothy D Wilhelm
(74) *Attorney, Agent, or Firm*—Rankin, Hill & Clark LLP (57) ABSTRACT

A rear wheel toe angle control device that ensures a stable steering performance even when the cornering powers of laterally opposing rear wheels are different from each other. When a reduction in the cornering power of one of the rear wheels owing to a drop in the tire pressure or a temporary tire is determined, a control unit changes the toe angle of the other rear wheel in a direction to increase the slip angle of thereof, and additionally changes the toe angle of the one rear wheel in a direction to decrease the slip angle of thereof. The combined cornering power of the two rear wheels is maintained at a normal level, and the steering performance of the turning vehicle remains the same. This also contributes to a stable running performance of the vehicle, and a maximization of the total available cornering power of the rear wheels.

3 Claims, 7 Drawing Sheets

REAR WHEEL TOE ANGLE CONTROL DEVICE

TECHNICAL FIELD

The present invention relates to a rear wheel toe angle control device for controlling a rear wheel toe angle in a variable rear wheel toe angle vehicle, and in particular to a technology that controls a rear wheel toe angle depending on changes in the cornering power of rear wheels.

BACKGROUND OF THE INVENTION

In a four wheel vehicle, the front wheels are steered for changing the traveling direction of the vehicle, and are additionally given with a certain toe angle so as to ensure a motion stability of the vehicle. In recent years, it has also been proposed to control the toe angle of the rear wheels for the purpose of improving the stability of the vehicle when braking and the responsiveness when accelerating, and improving the heading response of the vehicle at the time of a low speed turn and the stability of the vehicle at the time of a high speed turn.

A typical toe angle control device mounted on such a vehicle includes an electric linear actuator interposed between the base end of a lateral link or trailing link of each rear wheel and the opposing part of the vehicle body so that the effective length of the lateral link or trailing link may be varied. See Japanese patent laid open publication No. 9-30438 (patent document 1).

A road wheel is typically fitted with a pneumatic tire made of synthetic rubber and filled with compressed air so that the ride quality of the vehicle may be ensured even when traveling over irregular road surfaces and the rolling resistance of the wheel may be controlled by minimizing the contact area with the road surface. As the condition of a tire strongly affects the driving performance of the vehicle, it is desirable to monitor the condition of the tire. Various proposals have been made. One such proposal is based on the use of a detecting the rotational speed of the wheel by forming a cogged wheel concentric to the wheel and counting the teeth of the cogged wheel with a suitable sensor attached to a stationary part of the vehicle adjacent to the cogged wheel, and comparing the detected rotational speed with a reference value. See Japanese patent laid open publication No. 10-71819 (patent document 2).

It is known that the pneumatic pressure of a tire can decrease over time depending on the mileage, driving condition and road condition, and this may impair the performance of the tire. When a tire becomes unusable due to air leakage or puncture, a temporary spare tire may be used. A temporary tire is typically significantly lower in performance than a normal tire. Also, a temporary tire typically wears much faster than a normal tire, and this further diminishes the performance of the tire. When the performance of one of the tires of a vehicle drops, the cornering power of the affected tire becomes lower than that of the unaffected laterally opposing tire. This is manifested when making a turn. The steering property differs depending on the direction of the turn, and a vehicle operator experiences a significant difficult in slaloming the vehicle in a stable manner.

BRIEF SUMMARY OF THE INVENTION

In view of such problems of the prior art, a primary object of the present invention is to provide a rear wheel toe angle control device that can ensure a stable steering performance even when the cornering powers of laterally opposing rear wheels are different from each other.

Such an object can be accomplished by the present invention by providing a rear wheel toe angle control device for a vehicle including a pair of rear wheels, comprising: a toe angle actuator for changing a toe angle of each rear wheel; a cornering power detecting unit for determining a cornering power of each rear wheel; and a control unit for controlling the toe angle actuator. When a reduction in the cornering power of one of the rear wheels is determined by the cornering power detecting unit, the control unit changes the toe angle of the other rear wheel in a direction to increase the slip angle of the other rear wheel.

Figure 7:
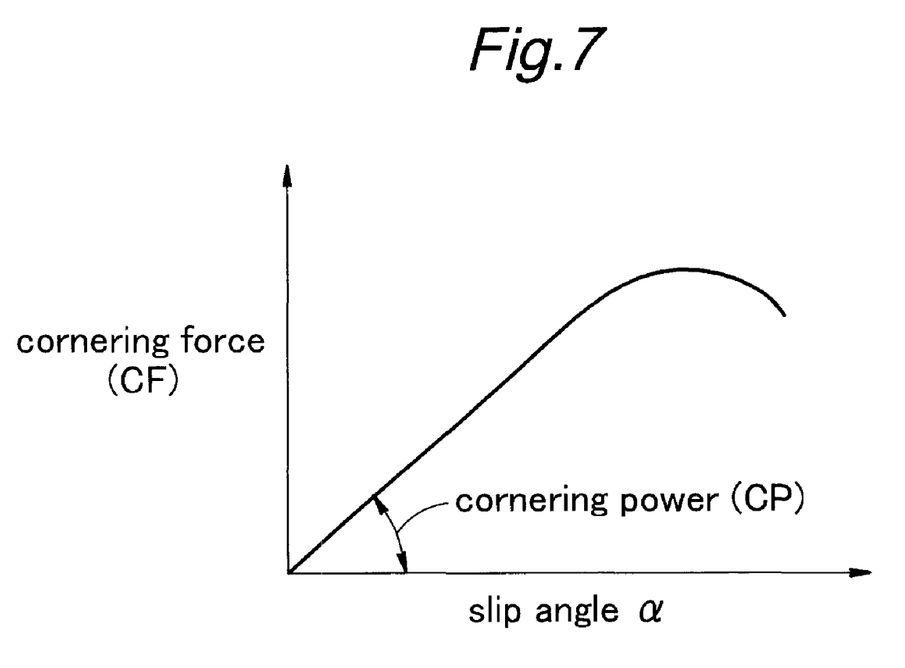
FIG. 7 is a graph for explaining the term "cornering power".

The term "cornering power" is defined as a cornering force of a tire per unit side slip angle. More specifically, as shown in FIG. 7, in a graph depicting a curve relating the lateral force (CF) to the slip angle α, the cornering power (CP) is given as an inclination of the curve which is substantially linear in a small slip angle range. This is an important index of the performance of a tire.

According to the present invention, when one of the rear wheel demonstrates a reduced cornering power, the slip angle of the other rear wheel is increased because the other rear wheel is likely to have a margin to produce an increased amount of cornering power that can make up for the reduction of the cornering power of the one rear wheel. Thereby, the combined cornering power of the two rear wheels can be maintained at a normal level, and it allows the steering performance of the vehicle when making a turn to remain the same in spite of the diminished performance of the one rear wheel. This also contributes to a stable running performance of the vehicle.

According to a preferred embodiment of the present invention, when a reduction in the cornering power of one of the rear wheels is determined by the cornering power detecting unit, the control unit additionally changes the toe angle of the one rear wheel in a direction to decrease the slip angle of the one rear wheel.

Thus, the deficit in the cornering power of the one rear wheel may be at least partly made up for by increasing the slip angle of the one rear wheel.

In practice, the reduction in the cornering power may be caused by a drop in the air pressure of the pneumatic tire of the one wheel or by the use of a temporary tire for the one wheel. Therefore, the cornering power detecting unit may comprise an air pressure sensor for detecting an air pressure of a pneumatic tire of each rear wheel or a tire kind determining unit for determining a kind of a tire fitted to each of the rear wheels.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
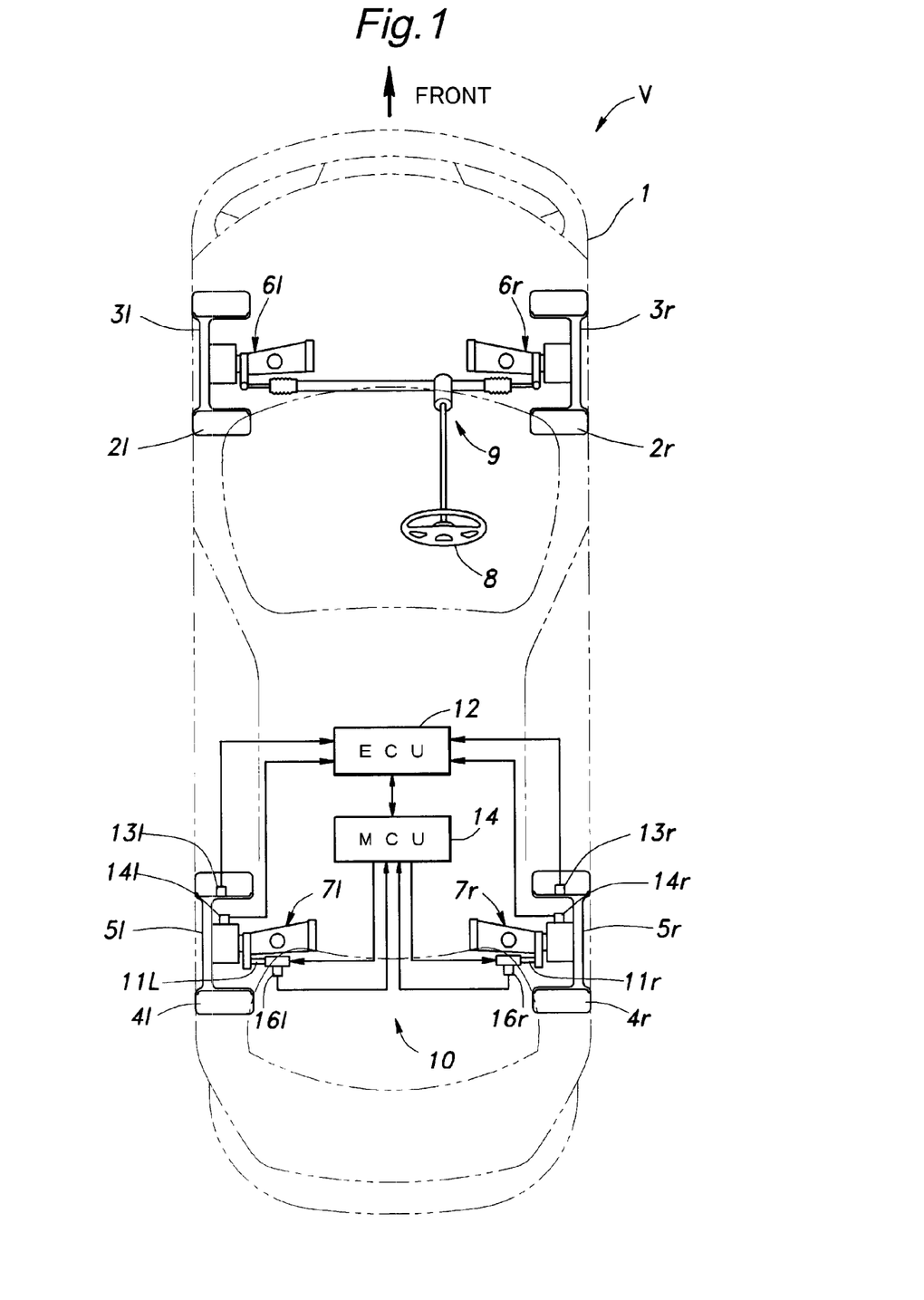
FIG. 1 is a schematic block diagram of a vehicle embodying the present invention.

FIG. 1 shows a vehicle incorporated with a rear wheel toe angle control device embodying the present invention. In FIG. 1, each wheel and associated components such as a tire and a suspension system are denoted with suffixes such as "r" and "l" in addition to the corresponding numeral to indicate the positioning of the corresponding component such as "left rear wheel 5*l* and right rear wheel 5*r*". When the various components are generally referred to, they are collectively denoted only with the corresponding numeral such "rear wheels 5".

Figure 2:
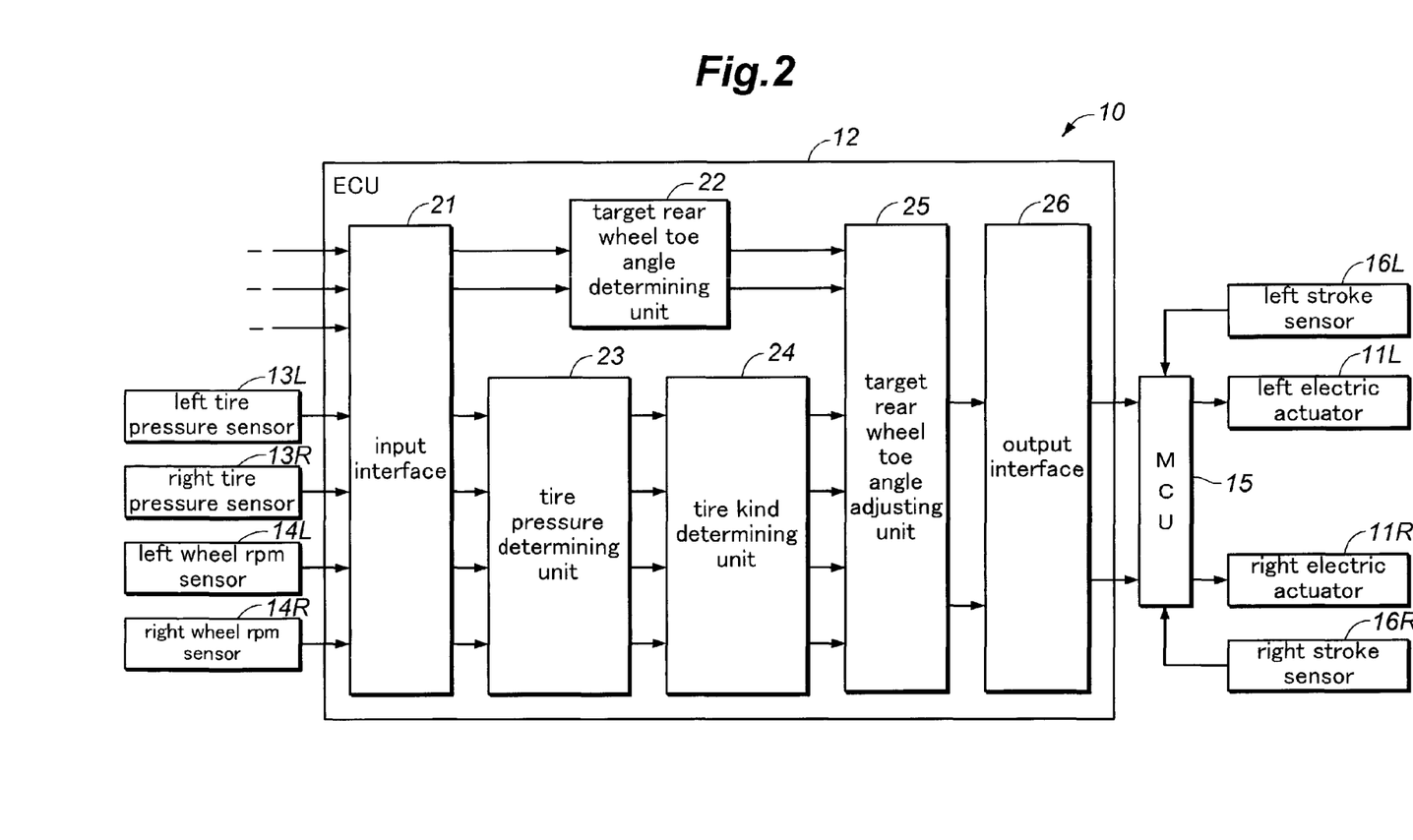
FIG. 2 is a functional block diagram of a rear wheel toe angle control device embodying the present invention.

FIG. 1 is a schematic diagram of a motor vehicle V equipped with a rear wheel toe angle control device 10 embodying the present invention, and FIG. 2 is a functional block diagram of the rear wheel toe angle control device 10. Referring to FIG. 1, the vehicle (rear wheel steering vehicle) V comprises a pair of front wheels 3*l* and 3*r* fitted with tires 2*l* and 2*r*, respectively, and rear wheels 5*l* and 5*r* fitted with tires 4*l* and 4*r*, respectively. These front and rear wheels 3 and 5 are supported by the vehicle body 1 by corresponding front wheel and rear wheel suspension systems 6 and 7, respectively.

The vehicle V further comprises a front wheel steering device 9 for directly steering the right and left front wheels 3*l* and 3*r* according to a turning of a steering wheel 8 and a rear wheel toe angle control device 10 that can individually change the toe angles $\theta l$ and $\theta t$ of the rear wheels 5*l* and 5*r* by extending and retracting electric actuators 11*l* and 11*r* provided in association with the rear suspension systems 7*l* and 7*r*, respectively. Each electric actuator 11 comprises a housing attached to the vehicle body 1, an electric motor provided with a reduction gear unit and received in the housing, a thread mechanism using a trapezoidal screw thread and an output rod forming a female thread member of the thread mechanism and connected to the corresponding rear wheel 5 so that the rotational movement of the electric motor is converted into a linear movement of the output rod via the thread mechanism. The lead angle and friction angle of the thread mechanism are selected in such a manner as to form a self-lock mechanism that prevents the input from the end of the output rod from causing the rotation of the electric motor. See Japanese patent laid open publication (kokai) No. 2008-164135, for instance.

The vehicle V is provided with a ECU (electronic control unit) 12 which is responsible for the overall control of various onboard systems and various sensors that may include a tire pressure sensor 13 and a wheel rotational speed sensor 14 provided on each rear wheel 5. The output signals of the various sensors are used by the ECU 12 for the control of the various systems of the vehicle V. The ECU 12 includes a microcomputer, ROM, RAM, a peripheral circuit, an input/output interface and various drivers, and is connected to the various sensors such as sensors 13 and 14 and a MCU (motor control unit) 15 which will be described hereinafter via a communication line. The ECU 12 computes target toe angles $\theta lt$ and $\theta rt$ for the right and left rear wheels 5*l* and 5*r* according to the detection signals of various sensors, and individually controls the toe angles of the rear wheels 5 by forwarding a drive control signal to the MCU 15.

The MCU 15 includes a drive control unit for controlling each electric actuator 11 according to the drive control signal supplied by the ECU 12, a current detecting unit for detecting electric current supplied to each electric actuator 11 and a fault detecting unit for detecting a fault of each electric actuator 11 according to the output signal of a stroke sensor 16 provided on each electric actuator 11 and the detected value of the corresponding current detecting unit.

Each stroke sensor 16 is incorporated with a differential transformer that detects the position of a permanent magnet attached to an adjacent part of a moveable end of the corresponding electric actuator 11 to detect a stroke thereof. Each electric actuator 11 extends or retracts and causes a desired toe angle $\theta l$ or $\theta r$ to the corresponding rear wheel 5 by a feedback control of the MCU 15 based on the deviation of the detection signal of the corresponding stroke sensor from the corresponding target toe angle.

In this vehicle V, by actuating the two electric actuators 11 simultaneously in a symmetric manner, the toe in and toe out of the rear wheels 5 can be controlled as desired. If one of the actuators 11 is extended while the other actuator is retracted, the rear wheels 5 can be steered (in the same direction). For instance, by detecting the operating condition of the vehicle, the motion stability of the vehicle may be improved by causing a toe out in the rear wheels 5 when the vehicle is accelerating and a toe in the rear wheels 5 when the vehicle is decelerating. Additionally or alternatively, the response of the vehicle may be improved by steering the rear wheels 5 in the same phase relationship as the front wheels 3 when the vehicle is turning at a high speed, and in the opposite phase relationship when the vehicle is turning at a low speed.

Referring to FIG. 2, the ECU 12 mounted on the vehicle 12 comprises an input interface 21, a target rear wheel toe angle determining unit 22, a tire pressure determining unit 23, a tire kind determining unit 24, rear wheel toe angle adjusting unit 25 and an output interface 26.

The input interface 21 receives signals from various sensors such as an air pressure signal detected by the air pressure sensors 13, a rotational speed signal detected by the wheel rotational speed sensors 14 and a stroke signal from the stroke sensors 16 of the electric actuators 11. The target rear wheel toe angle determining unit 22 determines the target toe angles $\theta lt$ and $\theta rt$ of the right and left rear wheels 5*l* and 5*r* according to the vehicle speed, front wheel steering angle, fore-and-aft acceleration of the vehicle body and other data received from the input interface 21.

The tire pressure determining unit 23 determines if the tire air pressure of each rear wheel 5 has dropped below a threshold level according to the air pressure signal detected by the corresponding tire air pressure sensor 13. The tire kind determining unit 24 determines the kind of the tire of each rear wheel 5 according to the air pressure signal detected by the tire air pressure sensor 13 and the rotational speed signal of the wheel rotational speed sensor 14. For instance, when a temporary tire is being used, the tire air pressure sensor 13 may indicate a proper tire pressure, but the wheel rotational speed is typically greater than that of a normal tire because the temporary tire has a smaller diameter than the normal tire. Thereby, it can be determined that a temporary tire is being used or not by monitoring the wheel rotational speed sensor 14. If the temporary tire is normally filled with a higher air pressure than a normal tire, an air pressure higher than a normal level indicates the use of a temporary tire. If the temporary tire is not fitted with a tire pressure sensor, absence of an air pressure signal or an extremely low air pressure signal indicates the use of a temporary tire.

The rear wheel toe angle adjusting unit 25 adjusts the target toe angles $\theta lt$ and $\theta rt$ of the right and left rear wheels 5*l* and 5*r* determined by the target rear wheel toe angle determining unit 22 according to the determination results of the tire air pressure determining unit 23 and tire kind determining unit 24. As will be described hereinafter, the target toe angle θt of each rear wheel 5 is effected in such a manner that the toe angle θ of the rear wheel 5 whose cornering power is reduced is changed in a direction to decrease the slip angle α thereof, and the toe angle θ of the other rear wheel is changed in a direction to increase the slip angle α thereof. As can be appreciated by a person skilled in the art, the direction in which a slip angle is produced can be determined from the dynamic condition of the vehicle such as the cornering direction, steering direction and so forth.

The target toe angles θt adjusted by the rear wheel toe angle adjusting unit 25 are forwarded to the MCU 15 via the output interface 26, and are converted into target strokes of the electric actuators 11 to be used as the control target values for the corresponding electric actuators 11.

Figure 3:
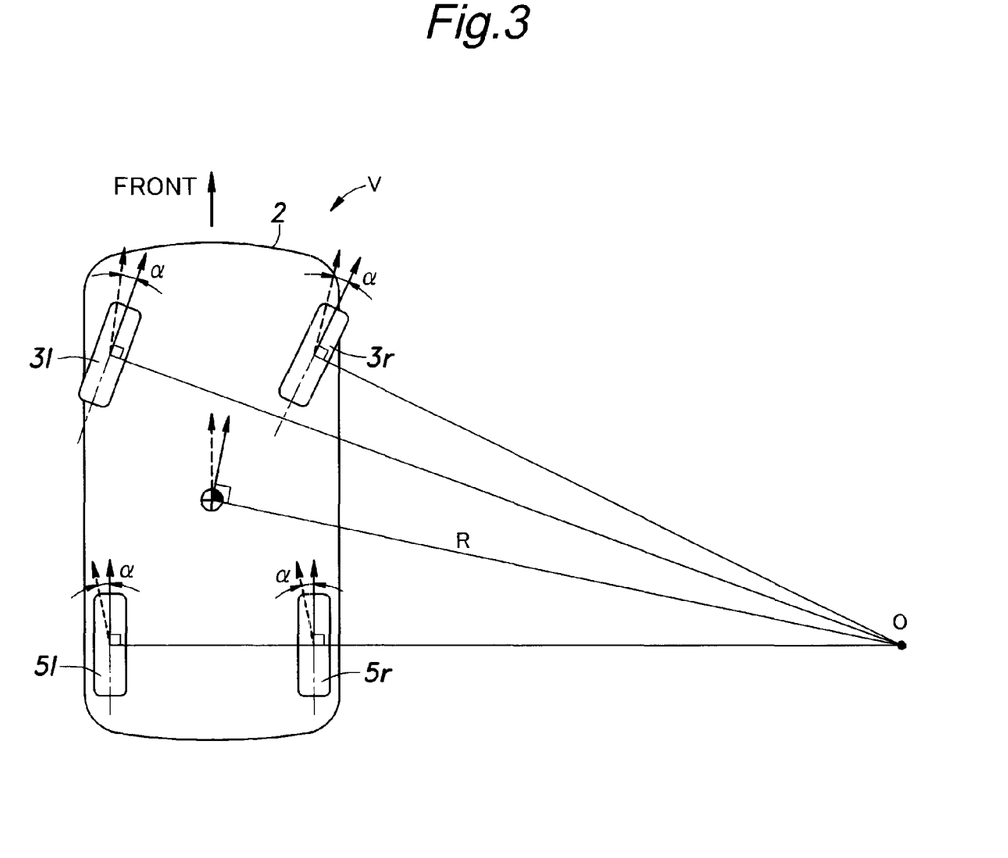
FIG. 3 is a diagram illustrating the slip angles of the four wheels of the vehicle.

The control process used for the adjustment of the target toe angles θlt and θrt of the illustrated embodiment is described in the following. The slip angle α of a tire is defined as an angle between the direction in which the tire is headed and direction of the actual movement of the tire. Referring to FIG. 3, when a vehicle V travels at a low speed with the front wheels 3 steered by a certain angle, the front wheels 3 and 5 move substantially in the same directions as the corresponding tires are headed as indicated by the solid line arrows, and the slip angle of each wheel is hence zero. Thus, a vehicle turns along a circle of radius R centered around a point O. As the speed of the vehicle V is increased, the vehicle is subjected to a centrifugal force, and the front wheels 3 and rear wheels 5 move slightly outwardly of the directions in which the corresponding wheels are headed as indicated by the broke line arrows, and this produces a certain slip angle α in each wheel. The vehicle therefore turns along a circle whose radius is greater than R. The greater the vehicle speed is and the smaller the turning radius is, the greater the slip angle α becomes.

Figure 4:
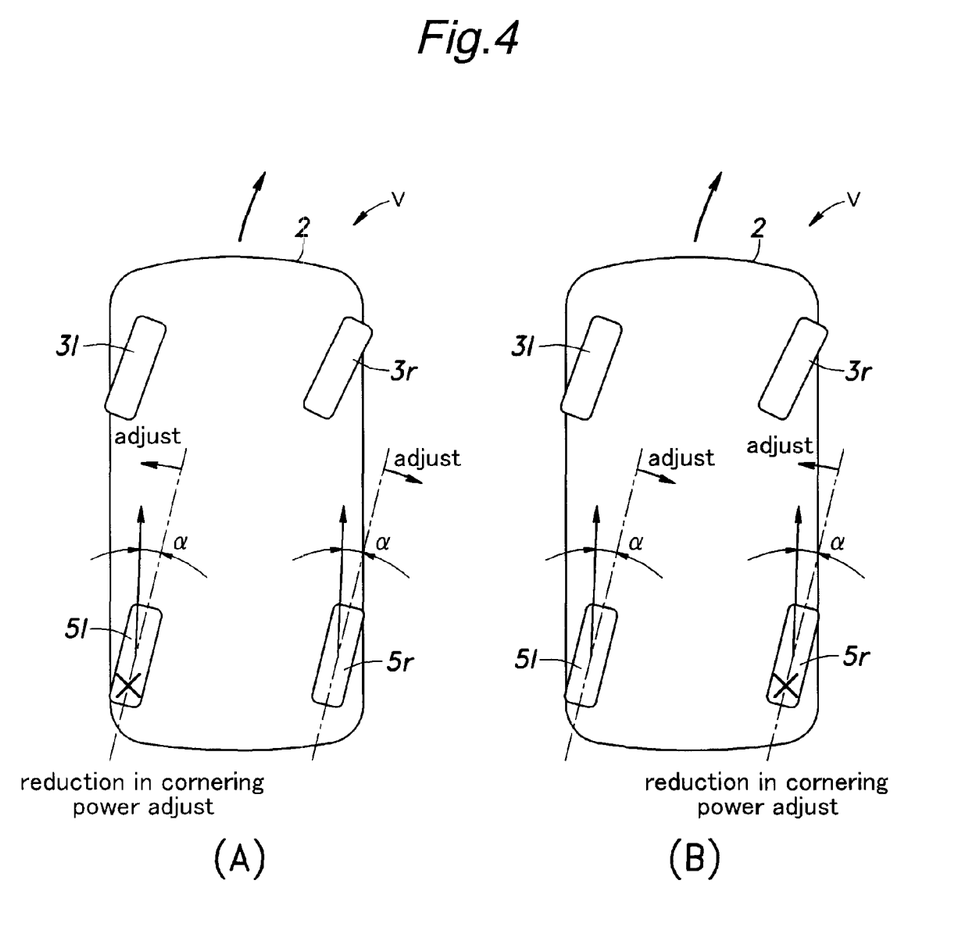
FIGS. 4a and 4b are diagrams showing how the rear wheel slip angles are adjusted when the rear wheels are steered in a same phase relationship to the front wheels according to the present invention.

FIGS. 4A and 4B show the case where the rear wheels 5 are steered in the same phase relationship to the front wheels 3 typically when the vehicle is cornering at a relatively high speed. The rear wheels 5 are steered inwardly with respect to the turning radius of the vehicle, and each rear wheel 5 is given with a slip angle α which is directed outwardly of the turning radius with respect to the heading direction of the corresponding wheel. Suppose that the cornering power of the left rear wheel 5l has diminished (as indicated by "X") while the vehicle is making a right turn as illustrated in FIG. 4A. In this case, the target toe angle θlt of the left rear wheel 5l is adjusted in a direction to reduce the slip angle α thereof or in a direction to reduce the toe angle (or outwardly of the turning circle). At the same time, the target toe angle θrt of the right rear wheel 5r is adjusted in a direction to increase the slip angle thereof or in a direction to increase the toe angle (or inwardly of the turning circle).

Conversely, suppose that the cornering power of the right rear wheel 5r has diminished while the vehicle is making a right turn as illustrated in FIG. 4B. In this case, the target toe angle θrt of the right rear wheel 5r is adjusted in a direction to reduce the slip angle α thereof or in a direction to reduce the toe angle (or outwardly of the turning circle). At the same time, the target toe angle θlt of the left rear wheel 5l is adjusted in a direction to increase the slip angle α thereof or in a direction to increase the toe angle (or inwardly of the turning circle).

Figure 5:
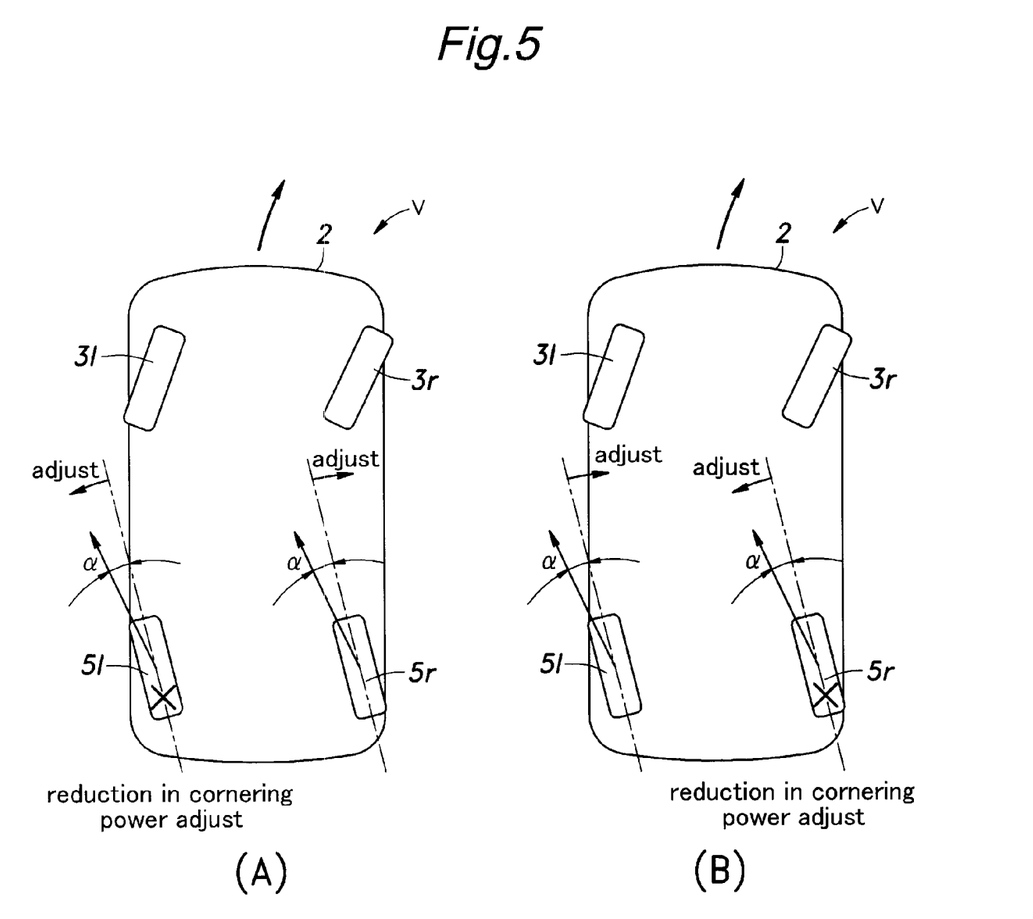
FIGS. 5a and 5b are diagrams showing how the rear wheel slip angles are adjusted when the rear wheels are steered in an opposite phase relationship to the front wheels according to the present invention.

FIGS. 5A and 5B show the case where the rear wheels 5 are steered in the opposite phase relationship to the front wheels 3 typically when the vehicle is cornering at a relatively high speed. The rear wheels 5 are steered outwardly with respect to the turning radius of the vehicle, and each rear wheel 5 is given with a slip angle α which is directed outwardly of the turning radius with respect to the heading direction of the corresponding wheel as was the case with the same phase rear wheel steering illustrated in FIGS. 4A and 4B. Suppose that the cornering power of the left rear wheel 5l has diminished while the vehicle is making a right turn as illustrated in FIG. 5A. In this case, the target toe angle θlt of the left rear wheel 5l is adjusted in a direction to reduce the slip angle α thereof or in a direction to increase the toe angle (or outwardly of the turning circle). At the same time, the target toe angle θrt of the right rear wheel 5r is adjusted in a direction to increase the slip angle α thereof or in a direction to decrease the toe angle (or inwardly of the turning circle).

Conversely, suppose that the cornering power of the right rear wheel 5r has diminished while the vehicle is making a right turn as illustrated in FIG. 5B. In this case, the target toe angle θrt of the right rear wheel 5r is adjusted in a direction to reduce the slip angle α thereof or in a direction to increase the toe angle (or outwardly of the turning circle). At the same time, the target toe angle θlt of the left rear wheel 5l is adjusted in a direction to increase the slip angle α thereof or in a direction to decrease the toe angle (or inwardly of the turning circle).

Although not shown in the drawings, also when the toe angle of the rear wheels is zero, a similar measure may be applied to the rear wheel toe angle control device 10. Suppose that the vehicle is cornering, and the cornering power of one of the rear wheels is reduced from a normal level, the target toe angle θt of the affected rear wheel (producing the reduced cornering power) is adjusted so as to reduce the slip angle thereof (or in a toe out direction in case of the outer rear wheel and in a toe in direction in case of the inner rear wheel), and the target toe angle of the other rear wheel (unaffected rear wheel) is adjusted so as to increase the slip angle thereof (or in a toe in direction in case of the outer rear wheel and in a toe out direction in case of the inner rear wheel).

Figure 6:
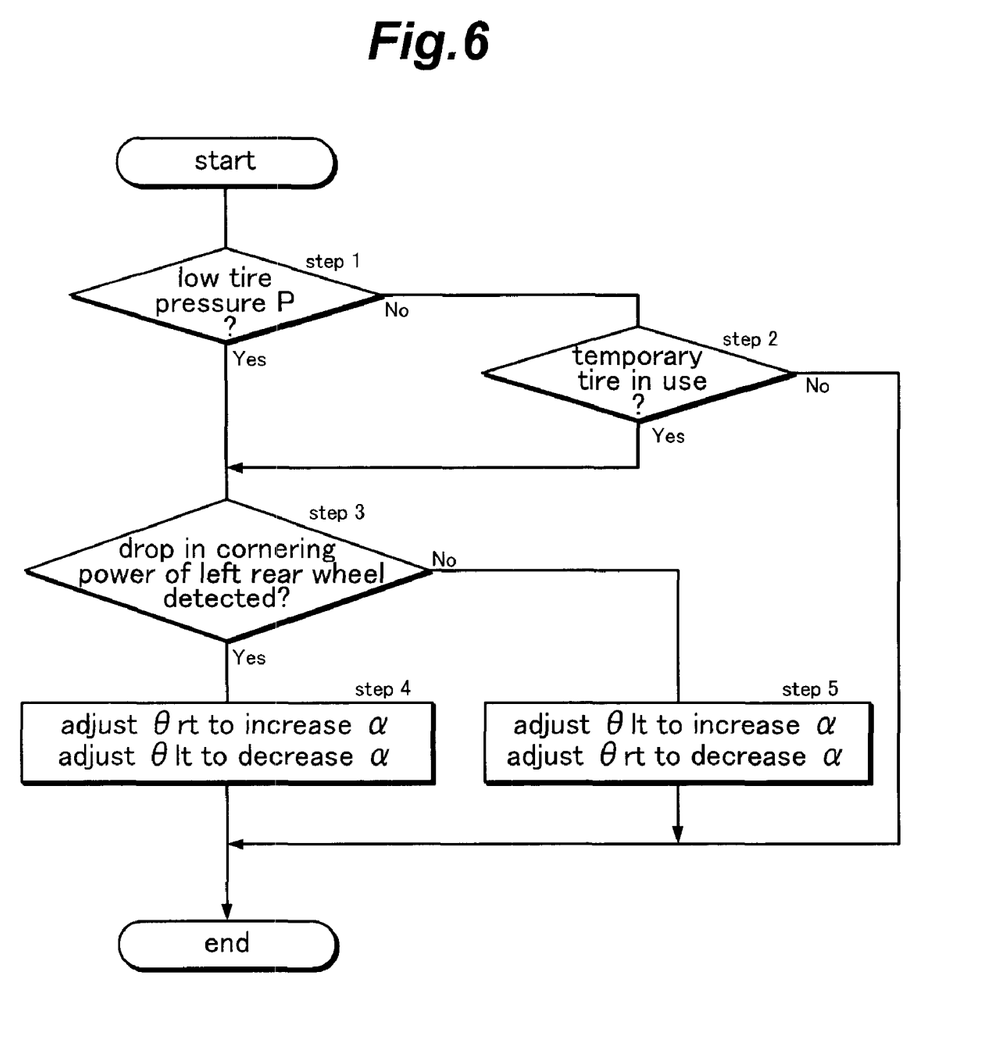
FIG. 6 is a flowchart showing the process of adjusting the rear wheel toe angles in various situations.

The process of adjusting the target rear wheel toe angles by the rear wheel toe angle control device 10 according to the present invention is described in the following with reference to FIG. 6. Once the engine of the vehicle V is started, the following control flow is executed at a prescribed interval.

The tire pressure determining unit 23 of the ECU 12 determines if the tire pressure $P_l$, $P_r$ of either rear wheel has dropped beyond a prescribed level in step 1. In this case, the determination result is yes if the tire pressure P of one of the rear wheels is below a prescribed level, and is no if the tire pressures of the two rear wheels are both below a prescribed level or both normal.

When no drop in tire pressure is detected (the determination result is no) in step 1, the tire kind determining unit 24 of the ECU 12 determines if either one of the rear wheels is fitted with a tire having a reduced diameter such as a temporary tire in step 2. In this case, the determination result is yes if one of the rear wheels is fitted with a temporary tire, and is no if neither of the rear wheels is fitted with a temporary tire or both the rear wheels are fitted with temporary tires. The control process ends when neither of the rear wheels is fitted with a temporary tire or both the rear wheels are fitted with temporary tires (or when the determination result of step 2 is no).

When a reduction in the tire pressure is detected step 1 or when the use of a temporary tire is detected in step 2, the rear wheel toe angle adjusting unit 25 of the ECU 12 determines if the tire 4 producing a reduced cornering power owing to a drop in tire pressure or the use of a temporary tire belongs to the left rear wheel 5l in step 3. If this determination result is yes, the target toe angle θrt of the right rear wheel 5r determined according to the vehicle speed and front wheel steering angle is adjusted so as to increase the slip angle α thereof, and the target toe angle θlt of the left rear wheel 5l determined in a similar fashion is adjusted so as to decrease the slip angle α thereof. This concludes the control process.

If the rear wheel toe angle adjusting unit 25 of the ECU 12 determines that the tire 4 producing a reduced cornering power owing to a drop in tire pressure or the use of a temporary tire belongs to the right rear wheel 5r in step 3, the target toe angle θlt of the left rear wheel 5l determined according to the vehicle speed and front wheel steering angle is adjusted so as to increase the slip angle α thereof, and the target toe angle θrt of the right rear wheel 5r determined in a similar fashion is adjusted so as to decrease the slip angle α thereof. This concludes the control process.

In the foregoing control process, it is desirable to adjust the toe angles in relation to the extent of the reduction in the cornering power of one of the rear wheels. It can be accomplished, for instance, by relating a reduction in the cornering power to the extent of the reduction in the tire pressure and to the use of a temporary tire. It can be implemented as a map that associates the amount of toe angle adjustment to the drop in the tire pressure and the use of a temporary tire.

As can be appreciated from the foregoing discussion, when one of the rear wheels is detected to suffer from a low tire pressure or be fitted with a temporary tire, it is assumed that the affected wheel produces a reduced amount of cornering power. Therefore, the target toe angle of the other rear wheel is adjusted so as to increase the slip angle thereof so that the cornering force of the unaffected rear wheel is increased and the combined cornering power of the rear wheels is maintained at a normal level. As a result, the handling of the vehicle can be kept unchanged, and the motion stability of the vehicle at the time of cornering can be ensured. Also, by adjusting the target toe angle of the rear wheel that produces a reduced amount of cornering force owing to a low tire pressure or the use of a temporary tire in a direction to decrease the slip angle, the affected rear wheel is required to support a reduced amount of cornering force so that bursting, dislodging of the tire rim and other forms of tire damage may be avoided. Also, by such an uneven distribution of the cornering forces between the two rear wheels, the total cornering force of the two rear wheels that is available can be maximized under the given condition of the tires of the two rear wheels, and this increases the capability of the vehicle to withstand extreme cornering conditions.

Although the present invention has been described in terms of a preferred embodiment thereof, it is obvious to a person skilled in the art that various alterations and modifications are possible without departing from the scope of the present invention which is set forth in the appended claims. For instance, in the foregoing description, upon detection of a reduced cornering power of one of the rear wheels, the toe angles of both the affected rear wheel and unaffected rear wheel were adjusted, but it is within the purview of the present invention to adjust only the toe angle of the affected rear wheel or the unaffected rear wheel. The present invention is also applicable to a case where the cornering power of each rear wheel is estimated from the various state variables of the vehicle other than the tire pressures and the use of a temporary tire.

The contents of the original Japanese patent application on which the Paris Convention priority claim is made for the present application are incorporated in this application by reference.

The invention claimed is:

1. A rear wheel toe angle control device for a vehicle including a pair of rear wheels, comprising:
   a toe angle actuator for changing a toe angle of each rear wheel;
   a cornering power detecting unit for determining a cornering power of each rear wheel; and
   a control unit for controlling the toe angle actuator;
   wherein, when a reduction in the cornering power of one of the rear wheels is determined by the cornering power detecting unit, the control unit changes the toe angle of the other rear wheel in a direction to increase a slip angle of the other rear wheel.

2. The rear wheel toe angle control device according to claim 1, wherein, when a reduction in the cornering power of one of the rear wheels is determined by the cornering power detecting unit, the control unit additionally changes the toe angle of the one rear wheel in a direction to decrease the slip angle of the one rear wheel.

3. The rear wheel toe angle control device according to claim 1, wherein the cornering power detecting unit comprises at least a member of a group consisting of an air pressure sensor for detecting an air pressure of a pneumatic tire of each rear wheel and a tire kind determining unit for determining a kind of a tire fitted to each of the rear wheels.

* * * * *